United States Patent [19]

Matsushita et al.

[11] 4,216,572
[45] Aug. 12, 1980

[54] REPLACEABLE GANG HEAD MACHINE TOOL

[75] Inventors: Takeshi Matsushita; Jinsei Ida, both of Sayama; Kazuo Otsuka, Kawagoe, all of Japan

[73] Assignee: Honda Giken Kogyo Kabushiki Kaisha, Tokyo, Japan

[21] Appl. No.: 967,307

[22] Filed: Dec. 7, 1978

[51] Int. Cl.$^2$ ............................................. B23Q 3/157
[52] U.S. Cl. ..................... 29/568; 29/26 A; 408/35
[58] Field of Search ............... 29/26 A, 568; 408/35

[56] References Cited
U.S. PATENT DOCUMENTS

| | | | |
|---|---|---|---|
| 2,577,766 | 12/1951 | Johnson et al. | 409/158 |
| 3,200,492 | 8/1965 | Lehmkuhl | 29/568 |
| 3,354,761 | 11/1967 | Sadier | 29/568 X |
| 4,038,739 | 8/1977 | Nobejl | 29/568 |
| 4,110,897 | 9/1978 | Hipwell et al. | 29/568 |

Primary Examiner—Z. R. Bilinsky
Attorney, Agent, or Firm—Haseltine, Lake & Waters

[57] ABSTRACT

A replaceable gang head machine tool unit having a driving motor, the unit being mounted on a slide table arranged to be driven and advance in a given direction wherein: there is provided an annular rail comprising a rear stationary rail and a front movable rail disposed on a machine base, a plurality of gang heads disposed around the annular rail and supported thereon, the plurality of gang heads being arranged to be rotated on the annular rail by an index table to permit any desired gang head to be selected therefrom on the movable rail. When the working unit is in a retreated position in the machine base, the selected head on the movable rail may be joined to the unit for travel therewith together with the movable rail.

9 Claims, 5 Drawing Figures

REPLACEABLE GANG HEAD MACHINE TOOL

BACKGROUND OF INVENTION

The present invention relates to a machine tool of the type in which a plurality of gang heads different in type one from another are provided and any one desired is freely selected to be used.

As for this kind of machine tool, there has been hitherto known a type in which plural gang heads are provided on a stock yard comprising an annular rail and any desired one is selected therefrom to be used. With this type, however, it is comparatively troublesome to attach and detach the selected one in relation to the rail, and thus it involves the disadvantage that it requires comparatively much time and much trouble in replacing one gang head with another.

SUMMARY OF INVENTION

The main object of the invention is to provide a machine tool which overcomes the disadvantages of the prior art.

The invention achieves this object by a machine tool comprising a working unit having a driving motor and mounted on a slide table arranged to be driven by a feed motor and an annular rail comprising a rear stationary rail and a front movable rail disposed on a machine base. The plurality of gang heads are disposed around the annular rail for being supported thereon, and the gang heads are arranged to be turned along on the annular rail by means of an index table provided on the gang heads and thereby any desired one may be selected on the movable rail. Additionally, it is so arranged that, when the foregoing working unit placed at its retreated position on the rear part of the machine base is advanced, the selected gang head on the movable rail may be joined to the unit for travel therewith together with the movable rail.

Other objects and advantages of the present invention will be best understood with respect to the accompanying specification, claims and drawings.

IN THE DRAWINGS

DESCRIPTION OF THE INVENTION

Figure 1:
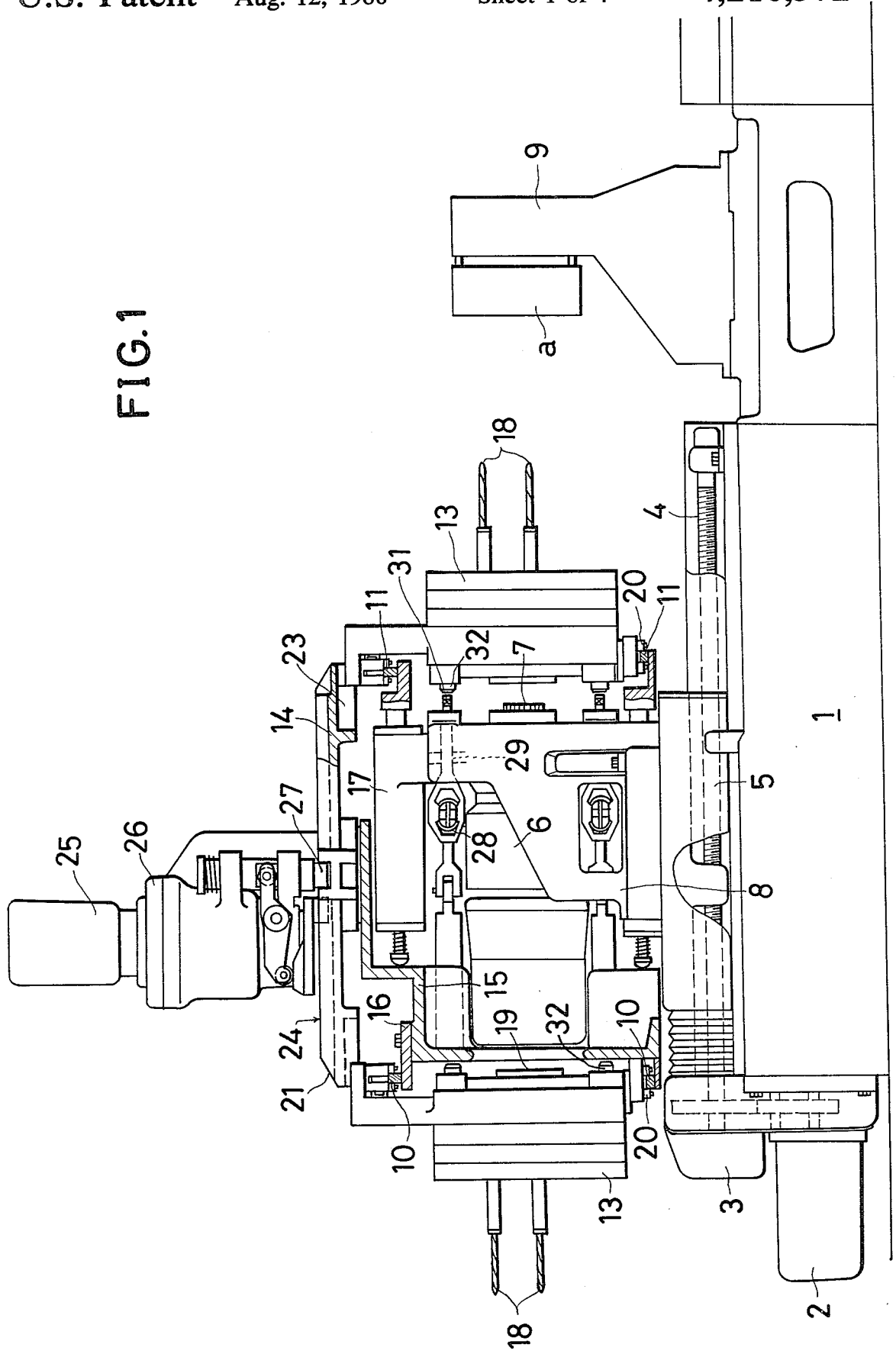
FIG. 1 is a side view, partly broken away, of one embodiment of the invention.
Figure 2:
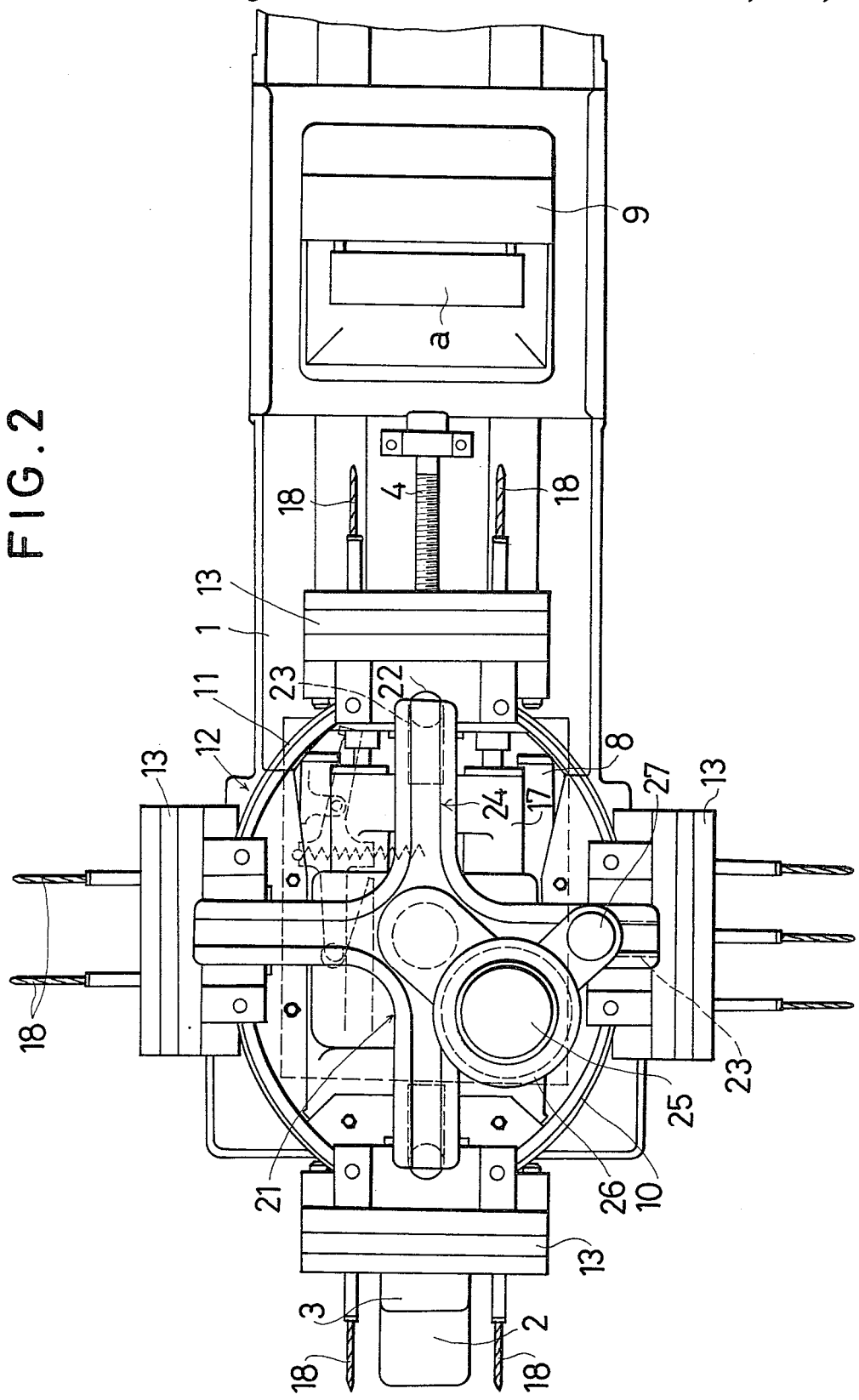
FIG. 2 is a top plan view of the same.
Figure 3:
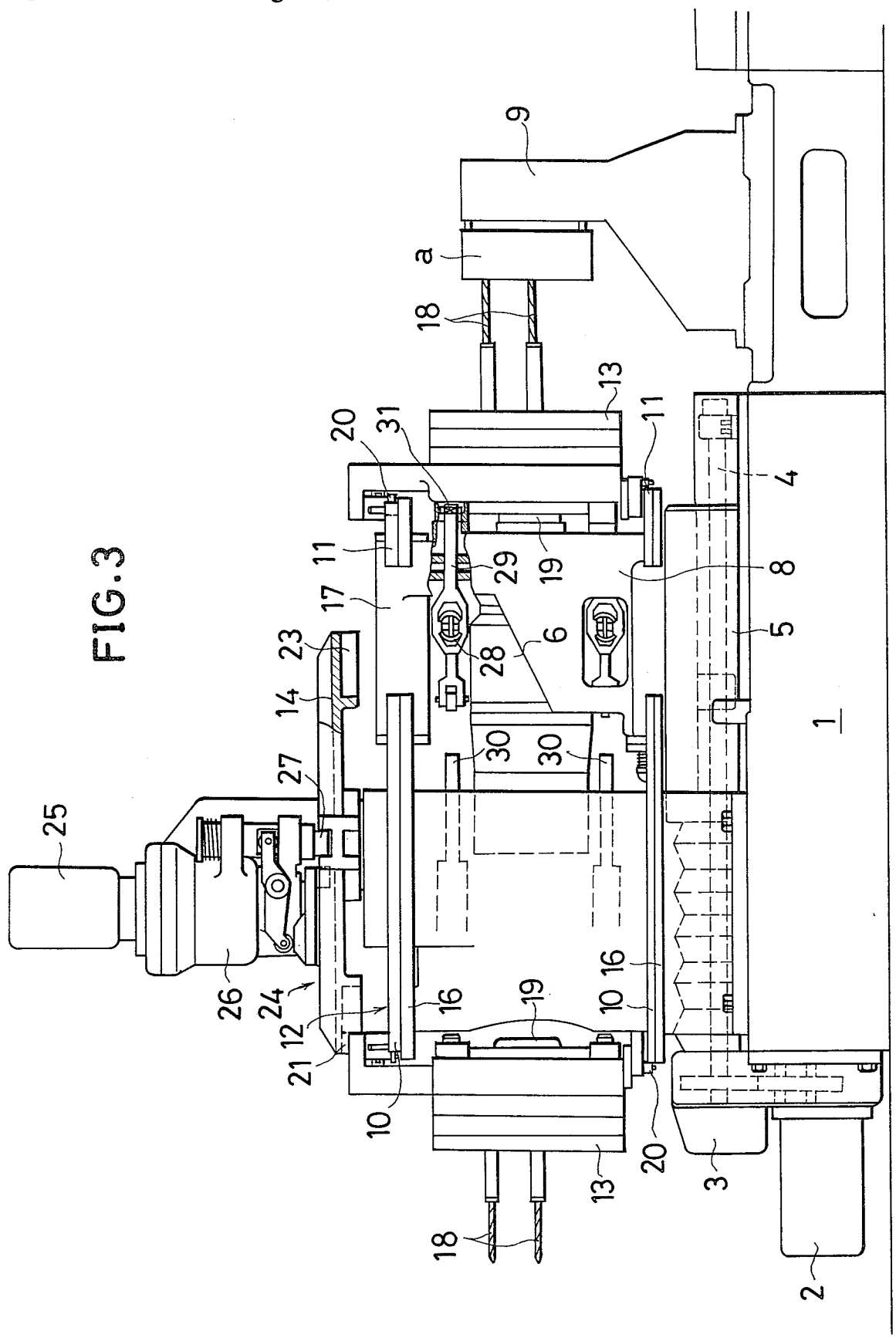
FIG. 3 is a side view, partly broken away, of the embodiment of the invention where one of the gang heads is selected for operation.
Figure 4:
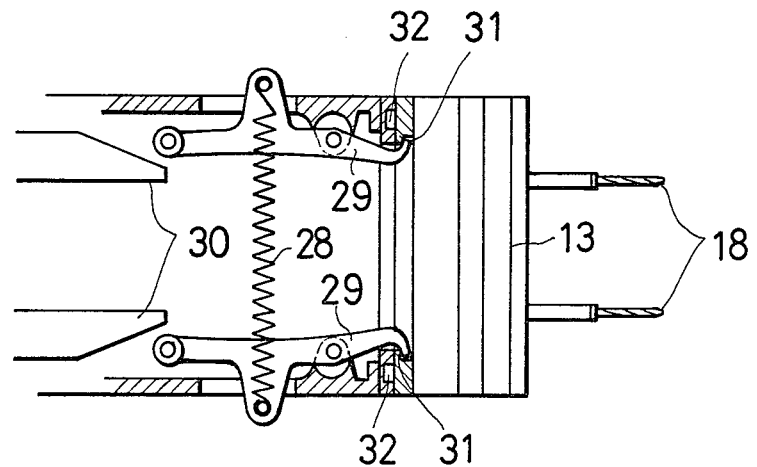
FIGS. 4 and 5 are respective plan views, partly in section, of operative and inoperative conditions of a clamp arm section of the apparatus.

Referring to the drawings, a machine base 1 supports a forwardly and backwardly movable slide table 5 which is in threaded engagement with a longitudinally extending feed screw rod 4 arranged to be driven through a reduction gear 3 by a feed motor 2, such as a pulse motor or the like on the rear side of the machine base 1. A working unit 8 is fixedly mounted on the table 5 and includes a driving motor 6 and a frontward driving shaft 7 drivingly coupled to the motor. Thus, the unit 8 can be given an advance movement feed and a retreat movement feed along with the table 5 by regular rotation and the reversal of the motor 2. In an ordinary condition, as shown in FIGS. 1 and 2, the unit 8 is situated at its retreated end position on the rear side region of the machine base 1.

A table 9 is provided in front of the machine base 1, and a workpiece a to be machined is detachably attached thereto.

A pair of upper and lower annular rails 12, 12 each comprising a rear stationary rail 10 and a front movable rail 11, are arranged at the top and bottom on the machine base 1 so as to encircle the working unit 8 located at its retreated end position, and a plurality of gang heads 13, for instance, four heads are disposed at regular angular intervals around the rails 12, 12 for support thereon. Additionally, an index table 14 is provided above the gang heads 13 so that by turning the index table 14, the plural gang heads 13 may be turned by following the index table along the rails 12, 12 and thus any desired gang head may be selected on the movable rails 11, 11.

More in detail, each of the stationary rails 10, 10 is connected through a supporting arm 16 to the outer periphery of a supporting frame 15 mounted fixedly on the rear part of the machine base 1. Each of the movable rails 11, 11 is connected through a pair of air cylinders 17 to the front surface of the working unit 8. Each of the gang heads 13, 13 is provided with a plurality of tool spindles 18 projecting forwardly and with a central common operation shaft 19 connected to the spindles. Additionally, each gang head 13 is provided on its rear portion and at each of its upper and lower sides, with a pair of right and left guide rollers 20, 20 so that the gang head 13 may be detachably in engagement at each pair of rollers 20, 20 with each rail 12 for being supported thereon.

Additionally, the index table 14 is rotatably mounted on the upper surface of the supporting frame 15, and the index table 14 has four index arms 21 corresponding to the four gang heads 13, and each arm 21 and each corresponding head 13 are in engagement with one another through a pin 22 and a pin groove 23. Additionally, the upper surface of the table 14 is formed as a Geneva gear 24, and a Geneva pin 27, arranged to be driven through a reduction gear 26 by a motor 25 provided above the table, is in engagement with the Geneva gear 24, so that the table 14 may be given an intermittent turning motion of 90 degrees each by the operation of the motor 25. In other words, the four gang heads 13, may be given intermittent rotatable motion of 90 degrees each and thereby any one thereof may be selected in order on the movable rails 11, 11.

Figure 5:
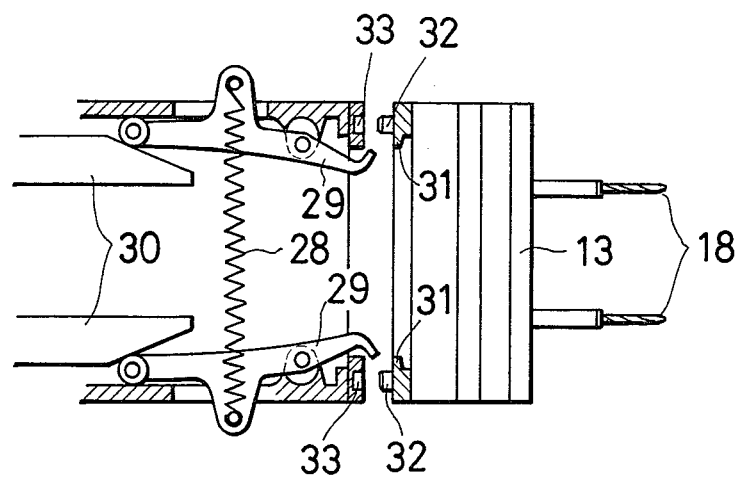

Additionally, if the working unit 8 is advanced from the retreated end position, the selected gang head may be automatically joined thereto. The unit 8 is provided at each of its upper and lower portions with a pair of right and left clamp arms 29, 209 urged towards an open position by a spring 28, and at the rear of the arm is a corresponding pair of stationary arms 30, 30 arranged to be brought into engagement with the tail ends of the pair of arms 29, 29 for pushing the arms to a closed position against the action of the spring 28, when each pair of clamp arms 29, 29 are being retreated. Additionally, each gang head 13 is provided with a pair of clamp claws 31, 31 arranged to be brought into engagement with each pair of clamp arms 29, 29, so that when the working unit 8 is located at the initial retreated end position, the respective arms 29, 29 are kept at their closed inoperative positions as shown in FIG. 5. If the unit 8 is advanced, the arms 29, 29 are released from the arms 30, 30 and are brought into their opened operative positions so as to be in engagement with the respective clamp claws 31, 31.

In other words, the working unit 8 is automatically joined to the selected gang head 13 in its advance movement, and on this occasion the driving shaft 7 on the working unit 8 and the operation shaft 19 on the gang head 13 are brought into splined engagement one with another. For ensuring this joint operation, the facing surfaces of the unit 8 and the head 13 are provided with positioning pins 32 and pin openings 33 in plural groups.

BEST MODE

In the initial stage, the working unit 8 is situated at the retreated end position as shown in FIGS. 1 and 2, and at this position each movable rail 11 is in contact with each stationary rail 10, so that each annular rail 12 is formed by the two rails 11, 10. If, under this condition, the index table 14 is operated, the four gang heads 13 are thereby turned, so that any desired gang head may be positioned on the movable rails 11, 11 for being engaged by the unit 8. Accordingly, if the unit 8 is then advanced, each pair of clamp arms 29, 29 are opened and are brought in engagement with the corresponding clamp claws 31, 31 as mentioned before, and thus the unit 8 is joined to the selected gang head 13. Thereafter, if the unit 8 is further advanced, the head 13 is also advanced with the unit, along with the movable rails 11, 11, and the workpiece a in front of the head can be treated by the same. Thereafter, in order to replace the gang head with another one, the unit 8 is returned to the initial retreated end position. By the return movement toward the end position, each pair of the clamp arms 31, 31 are brought into their inoperative positions to release the unit 8 from its connection with the head 13. Also each movable rail 11 is brought into contact with each stationary rail 10 to again form the annular rail 12. Accordingly, the replacement of the head can be effected by selecting the new gang head 13 by operating the index table 14.

Thus, according to this invention, plural gang heads are provided on an annular rail comprising a stationary rail and a movable rail and any desired gang head is freely selected on the movable rail by means of an index table. On an advance movement of the working unit situated at the rear position thereof, the selected gang head is joined thereto for being carried by the work unit so that it can be simply and assuredly effected to select for operation any desired one of the plural gang heads.

It will be appreciated that various changes and modifications may be made in the foregoing apparatus without departing from the spirit of the present invention and as many changes may be made in the embodiments herein set forth, it being understood that all matter described herein is to be interpreted as illustrative and not in a limiting sense.

What is claimed:

1. A replaceable gang head machine tool unit comprising a base, a slide table mounted on said base for movement between retracted and advanced positions, an annular rail on said machine base including a rear stationary portion and a front movable portion, a plurality of gang heads mounted on said rail for travel thereon, said gang heads being disposed in angular spaced relation on said rail, a rotatable index table mounted on said base above said rail in coaxial relation therewith, means detachably connecting said index table to said gang heads to advance the gang heads on said rail in accordance with the rotation of said index table, said gang heads successively passing through an operating position, a working unit carried on said slide table and movable therewith between a rearward inoperative position and a forward operative position, said gang heads in said operating position being proximate said working unit in said rearward operative position thereof, means on said working unit and on said gang heads for (a) detachably coupling said working unit with the particular gang head at said operating position as said working unit advances from said rearward inoperative position to said forward operative position and (b) for releasing the coupled gang head from said working unit as said working unit travels from said forward operative position to said rearward inoperative position, said means which detachably connects the index table with the gang heads comprising a pin and slot connection in which a pin is slidably movable in a slot and separable therefrom, said index table having grooves therein forming a Geneva gear, and means for driving said index table in rotation including a drive motor and a Geneva pin driven by said motor and engaged in the grooves in the index table to effect stepwise rotation of said index table.

2. A unit as claimed in claim 1 wherein said means which detachably couples and releases the gang heads with the working unit comprises pivotal latch arms and clamp claws engageable with said latch arms.

3. A unit as claimed in claim 2 wherein said clamp claws have inclined faces which engage said latch arms.

4. A unit as claimed in claim 3 wherein said latch arms are mounted on said unit and said clamp claws are on said gang heads.

5. A unit as claimed in claim 4 wherein said clamp arms are mounted in opposed relation, the means which detachably couples and releases the gang heads with the working unit further comprising spring means engaging said arms to pivot the same to engaged position with the clamp claws, and fixed arms positioned to engage the latch arms when the working unit approaches said rearward inoperative position to pivotably move said latch arms from the coupled position to the release position against the opposition of said spring means.

6. A unit as claimed in claim 5 wherein said fixed arms have inclined surfaces positioned to engage said latch arms.

7. A unit as claimed in claim 1 wherein said drive motor is mounted above said index table.

8. A unit as claimed in claim 1 wherein said movable portion of the rail travels with the selected gang head which is coupled to the working unit as said working unit travels to its forward operative position.

9. A unit as claimed in claim 8 comprising cylinder means connecting said movable rail portion with the working unit.

* * * * *